(12) United States Patent
Branecky et al.

(10) Patent No.: US 7,102,324 B2
(45) Date of Patent: Sep. 5, 2006

(54) FIXED SPEED DRIVE

(75) Inventors: Brian Thomas Branecky, Oconomowoc, WI (US); William L. Mehlhorn, Menomonee Falls, WI (US); Andrew W. Phillips, West Bend, WI (US); Albert Keith Pant, Carlisle, OH (US)

(73) Assignee: A.O. Smith Corporation, Milwaukee, WI (US)

( * ) Notice: Subject to any disclaimer, the term of this patent is extended or adjusted under 35 U.S.C. 154(b) by 57 days.

(21) Appl. No.: 10/662,052

(22) Filed: Sep. 12, 2003

(65) Prior Publication Data

US 2005/0057201 A1    Mar. 17, 2005

(51) Int. Cl.
*H02P 23/00* (2006.01)
*H02P 25/00* (2006.01)
*H02P 27/00* (2006.01)

(52) U.S. Cl. .................. 318/807; 318/805; 318/798

(58) Field of Classification Search ............... 318/727, 318/729, 772, 800–807, 254, 268, 811, 599
See application file for complete search history.

(56) References Cited

U.S. PATENT DOCUMENTS

| | | | | |
|---|---|---|---|---|
| 3,736,480 | A | * | 5/1973 | Lee ............................. 318/51 |
| 4,242,626 | A | * | 12/1980 | Gross ......................... 318/772 |
| 4,409,533 | A | * | 10/1983 | Kawabata .................... 318/807 |
| 4,566,289 | A | | 1/1986 | Iizuka et al. |
| 4,788,485 | A | | 11/1988 | Kawagishi et al. |
| 5,168,202 | A | | 12/1992 | Bradshaw et al. |
| 5,212,438 | A | | 5/1993 | Miyazaki et al. |
| 5,350,992 | A | * | 9/1994 | Colter ......................... 318/807 |
| 5,387,855 | A | * | 2/1995 | Miyazaki et al. ........... 318/805 |
| 5,444,350 | A | | 8/1995 | Werle et al. |
| 5,514,943 | A | | 5/1996 | Shapess |
| 5,612,605 | A | | 3/1997 | Tao |
| 5,689,169 | A | | 11/1997 | Kerkman et al. |
| 5,818,194 | A | | 10/1998 | Nordby |
| 5,883,490 | A | | 3/1999 | Moreira |
| 5,923,728 | A | | 7/1999 | Ikkai et al. |
| 5,965,995 | A | | 10/1999 | Seibel et al. |
| 5,994,869 | A | | 11/1999 | Becerra |
| 6,037,725 | A | | 3/2000 | Tolbert, Jr. |
| 6,075,328 | A | | 6/2000 | Notohara et al. |
| 6,081,091 | A | | 6/2000 | Mitchell et al. |
| 6,107,776 | A | | 8/2000 | Nakazawa |
| 6,118,239 | A | | 9/2000 | Kadah |
| 6,121,747 | A | | 9/2000 | Trachtenberg |
| 6,157,156 | A | | 12/2000 | Tsuruta |
| 6,172,476 | B1 | | 1/2001 | Tolbert, Jr. et al. |
| 6,198,240 | B1 | | 3/2001 | Notohara et al. |
| 6,246,207 | B1 | | 6/2001 | VanSistine et al. |
| 6,313,593 | B1 | | 11/2001 | Matsubara et al. |
| 6,316,895 | B1 | | 11/2001 | Ramarathnam |
| 6,329,785 | B1 | | 12/2001 | Starkie et al. |

(Continued)

*Primary Examiner*—Marlon T. Fletcher
*Assistant Examiner*—Renata McCloud
(74) *Attorney, Agent, or Firm*—Michael Best & Friedrich LLP

(57) ABSTRACT

A controller for an electric machine. The controller includes a first voltage input that directly provides a first voltage to the electric machine, a second voltage input configured to receive a second voltage, and an inverter coupled to the second voltage input. The inverter is configured to be activated by the second voltage, to frequency-regulate the second voltage to generate a frequency-regulated voltage, and to provide the frequency-regulated voltage to the electric machine.

27 Claims, 2 Drawing Sheets

U.S. PATENT DOCUMENTS

| | | |
|---|---|---|
| 6,356,043 B1 | 3/2002 | Baum |
| 6,369,544 B1 | 4/2002 | Kadah |
| 6,489,742 B1 | 12/2002 | Lumsden |
| 6,504,330 B1 | 1/2003 | Fletcher |
| 6,570,778 B1 * | 5/2003 | Lipo et al. .................... 363/41 |
| 6,603,280 B1 | 8/2003 | Notohara et al. |
| 2002/0079859 A1 | 6/2002 | Lumsden |
| 2003/0020428 A1 | 1/2003 | Masaki et al. |

* cited by examiner

FIXED SPEED DRIVE

BACKGROUND OF THE INVENTION

The present invention generally relates to induction motors, and particularly to a method and apparatuses for controlling an induction motor.

Many methods and apparatuses are used to control an induction motor. Exemplary methods and apparatuses include speed tab changing, triac controls, and fixed speed drive. In changing the speed tabs, an effective reduction in voltage or flux is provided to cause the motor to run at a reduced speed by the nature of a slip. The slip is a measurement of how much the movement of the rotor follows the excitation field, and is defined as the difference between the frequency of the excitation energy and the speed of the motor. While these controls provide adequate speed control, they do so at the expense of efficiency as the motor runs at a higher slip which is proportional to rotor conduction loss.

SUMMARY OF THE INVENTION

In the fixed speed drive, a series of signals are entered from the thermostat. These signals are then interpreted by a thermostat logic and timing control that is enabled by an inverter circuitry and a micro-controller. While the fixed speed drive is an inexpensive and efficient product that provides half speed settings, a number of components will have to be replaced when an original equipment manufacturer ("OEM") chooses to use the fixed speed drive. For example, the OEM may have to replace the induction motor with optional taps, and relays that are used to select voltage and speed. Replacing these components can be costly.

Accordingly, there is need for an interface between a thermostat and an induction motor that also provides high motor efficiency at low-speed. In a first embodiment of the invention, a fixed speed drive ("FSD") interface that includes a controller is configured to determine at which speed to operate a motor based on an AC input. The FSD interface receives electrical power from a tapped winding relay that has two AC input connections: a high-speed connection and a low-speed connection. The high-speed connection directly drives the motor. The low-speed connection powers the motor through an inverter or a capacitor and inverter sub-circuit. The FSD interface also includes an analog-to-digital converter ("ADC") that detects the difference in voltage between the high-speed and low-speed voltages. Based on this voltage difference from the ADC, a controller determines whether to power the motor from the high-speed connection or from the low-speed connection via the inverter.

The present invention also provides a controller for an electric machine. The controller includes a first voltage input, a second voltage input, and an inverter. The first voltage input is configured to receive a first voltage, and is operable to directly provide the first voltage to the electric machine. The second voltage input similarly configured to receive a second voltage. The inverter is coupled to the second voltage input, and is activated by the second voltage. The inverter is also configured to frequency-regulate the second voltage to generate a frequency-regulated voltage, and to provide the frequency-regulated voltage to the electric machine.

The present invention also provides a controller for an electric machine. The controller includes a voltage input that is configured to receive a first voltage, and a relay module that is coupled to the voltage input. The relay module is configured to relay the first voltage and to generate a second voltage. The controller also includes a half-bridge inverter that is coupled to the relay module, and that is configured to be activated by the second voltage, and to generate a frequency regulated voltage. The controller further includes a micro-controller that is coupled to the first and the second voltages, and that is configured to generate a soft control signal. The controller also includes a second relay that is coupled to the micro-controller. The second relay is also configured to select an electric machine operating voltage from the first voltage and the frequency regulated voltage using the soft control signal.

The present invention also provides a method of controlling an electric machine. The method includes the step of providing one source of unregulated electrical power selectively connected to the electric machine through a relay when a first speed is selected. The method includes the step of generating a second source of regulated electrical power when a second speed is selected, the second source is selectively connected to the electric machine through the relay. The method includes the step of selectively switching the relay to connect the electric machine to the one source corresponding to the first speed, and to the second source for operation of the electric machine corresponding to the second speed.

Other features and advantages of the invention will become apparent to those skilled in the art upon review of the following detailed description, claims, and drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION

Figure 1:
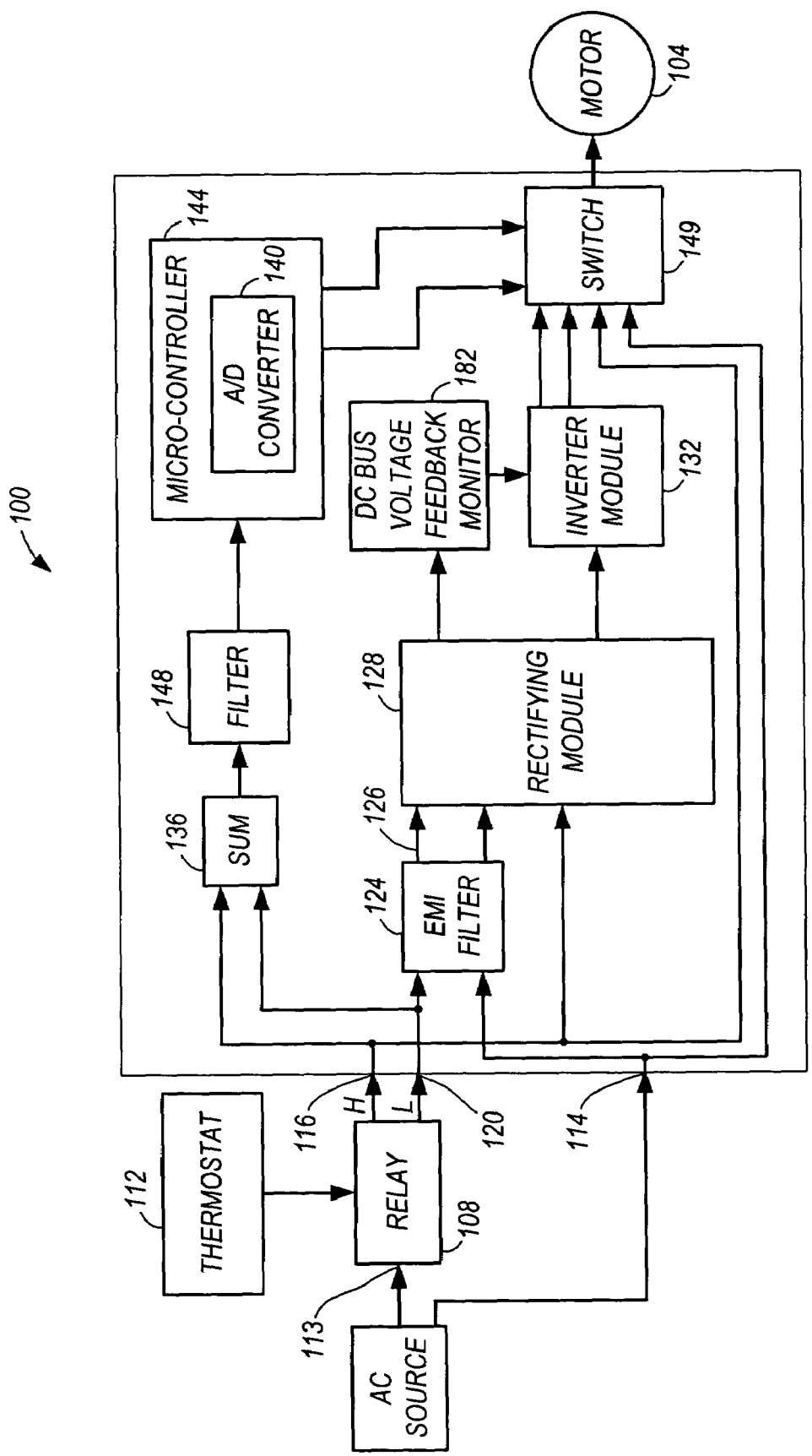
FIG. 1 shows a block diagram of a fixed speed drive interface according to the present invention.

FIG. 1 shows a block diagram of a FSD interface 100 coupled to an induction motor 104 according to the present invention. The interface 100 includes a thermostat relay or tapped winding relay 108 that receives a selection input from a thermostat 112, and power from an alternating current ("AC") power source line-in 113. The interface 100 also receives a second AC power source line-in at input 114. The tapped winding relay 108 has two speed outputs 116, 120 representing a high-speed signal and a low-speed signal, respectively. More specifically, the tapped winding relay 108 will generate a high-speed signal when the motor 104 is run at a full-speed mode, whereas the tapped winding relay 108 will generate a low-speed signal when the motor 104 is run at a low-speed mode. The low-speed signal output 120 is fed into an electromagnetic interference ("EMI") filter 124 to attenuate electromagnetic interference to generate a filtered low-speed output 126. The filtered low-speed output 126 and the high-speed signal output 116 are coupled to a rectifying circuit 128 to generate different levels of direct current ("DC"). The relay 108 includes a plurality of inputs that are opto-isolated from the high voltage side of the interface 100. The inputs can be configured for inputs, such as from a thermostat, to turn the interface 100 on for high speed operation at an operating frequency, for example, between 50 Hz and 60 Hz, or to turn the interface on for a preset low speed operation. Furthermore, these inputs can also be configured for pulse width modulation control for running the motor 104 at low speed.

Before proceeding further, it should be apparent from the figures that the high-speed output 116 and the low-speed output 120 are a high-speed input and a low-speed input to the FSD interface 100. These inputs are also referred to herein as the first and second voltage inputs. The high-speed output 116 and the low-speed output 120 are also summed individually in a summing module 136 to provide different analog voltages each representing a particular speed. For example, the high-speed output 116 is summed into a 10KΩ resistor via a 1MΩ resistor. Meanwhile, the filtered low-speed output 126 is summed into the 10KΩ resistor via a 499KΩ resistor to generate a summed voltage. The summing module 136 thus provides a summed voltage that represents either a high-speed signal or a low-speed signal. The summed voltage is further conditioned at a filter module 148 to filter out undesirable noise or to clean the summed voltage so that the summed voltage is detectable by an A/D converter ("ADC") 140. The ADC 140 can be embedded in a micro-controller 144 as shown in FIG. 1, or the ADC 140 is external to the micro-controller 144. Examples of micro-controller include embedded micro-controller, such as PIC 16C717I/SS from MicroChip, and ST micro-controller from ST Microelectronics. The micro-controller 144 reads in the summed voltage, and then generates a software control or selection signal based on the summed voltage. The micro-controller 144 further includes an internal memory (not shown) that stores a plurality of codes and associated parameters. Although the memory is described as internal to the micro-controller 144, external memory can also be used in the interface to store data such as customer-specific parameters.

In the embodiment shown, the rectifying circuit 128 includes a high-speed rectifier and a low-speed rectifier. Each of the rectifiers includes a full wave bridge rectifier that has four diodes. Additionally, the high-speed rectifier and the low-speed rectifier share a common pair of diodes, and a common rectified or DC output. The DC output is frequency regulated in a capacitor-inverter circuit or an inverter module 132. Particularly, the inverter module 132 includes a first capacitor that is serially connected to a second capacitor. The inverter module 132 also includes a plurality of power switches that are arranged in parallel with the first and the second capacitors. The inverter module 132 is configured to provide one or perhaps only a few fixed, predetermined speeds that are less than the rated full operating speed at full line voltage at input 116. At low speed, in order to reduce the torque output to match a fan law torque curve, the micro-controller 144 is configured to determine a quadratic voltage-to-frequency control relationship between an applied voltage and the operating frequency. As a result of the quadratic relationship, the motor 104 requires approximately only half the voltage normally supplied during full speed operation. Although voltage-to-frequency control relationship described in the embodiment is quadratic, other forms of motor applied voltage/operating frequency relationship can also be used such that the voltage and the frequency can be controllably applied. In the embodiment shown, the output frequency of the inverter module 132 ranges from about 32 Hz to about 45 Hz. A potentiometer can also be used to allow a user to adjust the output frequency in the same range.

Although the high-speed signal output 116 generally indicates the motor 104 is to be run at full speed (for example, between 50 Hz and 60 Hz), it will be appreciated that multiple full speed scenarios can be installed in systems where a multiple-tapped motor is used. Specifically, in an embodiment where a single speed single phase ("SSSP") permanent split capacitor ("PSC") motor is used the high-speed signal output 116 will have a single high-speed value at a fixed operating frequency, such as 60 Hz. In yet another embodiment, the interface 100 can be coupled to a multiple-tapped, single phase ("MTSP") PSC motor. In such case, the high-speed signal output 116 will have multiple speed values all running at a single operating frequency, such as 60 Hz. Furthermore, the interface 100 will have multiple outputs coupled to the MTSP PSC motor.

Referring back to FIG. 1, the interface 100 also includes a switching module 149. The switching module 149 selects either the low speed signal or voltage from the inverter module 132 based on a pair of software generated control or selection signals from the micro-controller 144. For example, when it is desired to run the motor 104 at high speed, the high speed output 116 of the tapped winding relay 108 will relay direct AC power from input 113, while the low speed output 120 is essentially open, deactivated or having a null value. The high-speed signal is also summed into the 10KΩ resistor via the 1MΩ resistor at the summing module 136, filtered at the filtering module 148, and fed to the ADC 140. Thereafter, the micro-controller 144 processes the summed voltage and switches the switching module 149 to relay the high-speed voltage to the motor 104. When it is desired to run the motor 104 at low speed, the low speed output 120 is EMI filtered, rectified at the rectifying circuit 128, and frequency regulated at the inverter module 132. Efficient and frequency regulated low speed voltage is thereafter provided to the switching module 149. The frequency regulated low speed voltage can then be selected by the micro-controller 144.

Figure 2:
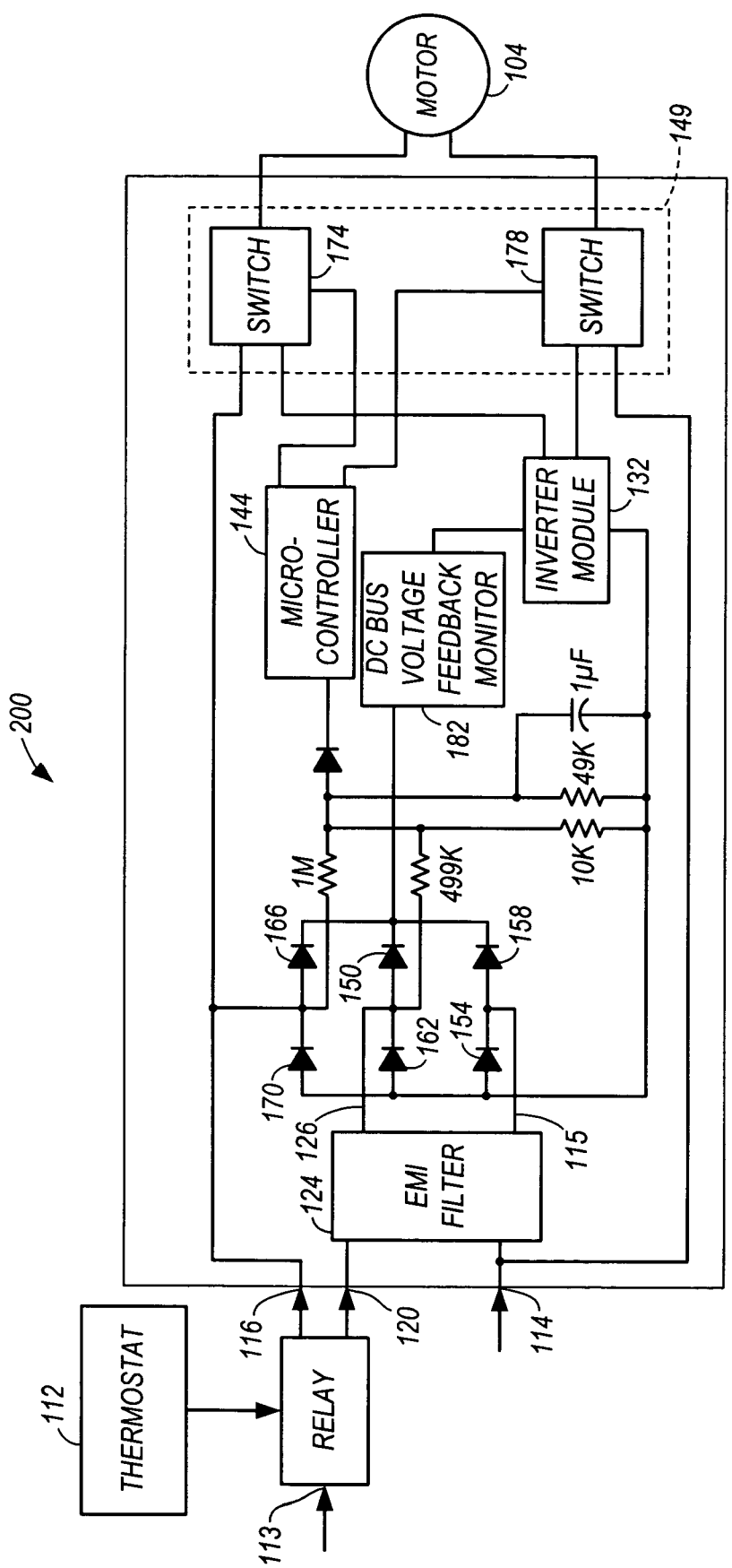
FIG. 2 shows a circuit diagram of the interface shown in FIG. 1 according to the present invention.

A detailed circuit diagram 200 of the interface 100 is shown in FIG. 2. Like parts are identified using like reference numerals. The low-speed output 120 is filtered at the EMI filter 124 to yield a filtered low-speed output 126. The filtered low-speed output 126 and an EMI filtered AC power line-in 115 are coupled to a low-speed rectifier of the rectifying circuit 128 to generate a low-speed DC signal. The low-speed rectifier includes a first pair of forward-biased diodes 150, 154, and a second pair of reversed-based diodes 158, 162. Meanwhile, the high-speed signal output 116 together with the EMI filtered AC power line-in 115 are coupled to a high-speed rectifier to generate a high-speed DC signal. Specifically, the high-speed rectifier includes a pair of forward-biased diodes 154, 166, and a pair of reversed-biased diodes 158. 170. In other words, both the low-speed rectifier and the high-speed rectifier share the diodes 154, and 158. A DC bus feedback monitor 182 couples the rectifying circuit 128 to the inverter module 132. The DC bus feedback monitor 182 is configured to monitor the rectified voltage (sometimes referred to as a DC bus voltage or a DC speed signal) of the rectifying circuit 128. When the monitored DC speed signal changes, the DC bus feedback monitor 182 will alert the micro-controller 144 to adjust the output duty cycle of the inverter module 132 accordingly. The DC bus feedback monitor 182 is also configured to detect different types of full speed AC voltages, such as 115 VAC and 230 VAC. The DC speed signal is then fed to the inverter module 132 to provide one or perhaps only a few fixed, predetermined speeds that are less than the rated full operating speed at full line voltage at input 116.

Furthermore, either the high-speed signal output 116 is summed into a 10KΩ resistor via a 1MΩ resistor, or the filtered low-speed output 132 is summed into the 10KΩ resistor via a 499KΩ resistor, to generate a summed voltage that represents an analog high-speed signal or low-speed signal. The summed analog voltage is then filtered via a resistor-capacitor type filter before being fed into the ADC 140 of the micro-controller 144. In the embodiment shown, a 49KΩ resistor is arranged in parallel to a 1 µF capacitor. It should be noted that other filter combinations, and other resistors and capacitor values can also be used to clean up the undesirable noise in the analog summed voltage.

The switching module 149 (FIG. 1) includes two switches 174 and 178 to select between a high-speed input voltage and a low-speed input voltage, as described earlier. Specifically, the micro-controller 144 sends a pair of software control signals or soft control signals as selection signals to the switches 174 and 178 based on the summed voltage. Meanwhile, the inverter module 132 and the high-speed voltages from inputs 114 and 116 provide a low-speed voltage input and a high-speed voltage input to the switches 174 and 178, respectively. When the selection signals from the micro-controller 144 represent high-speed signals, the switches 174 and 178 will couple the high-speed voltages from inputs 114 and 116 to the motor 104. At this time, the inverter module 132 is disabled, while a small amount of power is supplied to the micro-controller 144. When the selection signals from the micro-controller 144 represent low-speed signals, the switches 174 and 178 will couple the low-speed voltages from the inverter module 132 to the motor 104.

Generally, power demanded by a load is typically a non-linear function of the operating speed or frequency. Specifically, when P is the power demanded by a load, C is a constant and S is the motor speed, $P=CS^3$. That is, reducing the motor speed or the operating frequency of the motor by half will reduce the power demanded by the load to ⅛ of the original power when run at full speed. That is, the interface 100 can efficiently deliver power to the motor 104 using the inverter module 132 after a low-speed voltage has been detected. More specifically, when the low-speed voltage has been detected, the inverter module 132 will be activated. The inverter module 132, which includes a DC capacitor and a plurality of inverters, then regulates the low-speed voltage such that the low-speed voltage has a regulated or a predetermined operating frequency. For example, when the input 116 is run at 60 Hz, the inverted output voltage from the inverter module 132 can be configured to generate an operating frequency of 30 Hz, that is, half of the original frequency. Since the power is torque times speed, if the motor is run at half speed and the power applied is ⅛ of its original value, the torque is thus ¼ of its original value.

Furthermore, the interface 100 is also configured to detect feedback from the motor 104 when the high-speed or low-speed voltage outputs 116, 120 is disconnected via the tapped winding relay 108. This condition can cause both a high-speed and a low-speed voltage to be fed to the interface 100. More specifically, when the tapped winding relay 108 switches from high speed to low speed, there is normally a time delay for the motor 104 to switch from high speed to low speed. Ideally, there should be no voltage at the high-speed output 116 when switching from high speed to low speed. In practice, however, the motor 104 is still spinning at high speed while the tapped winding relay 108 is switching from high-speed voltage to low-speed voltage. At this time, the summing module 134 generates an unusually high summed voltage representing a sum of the high-speed voltage and the low-speed voltage. When both the low-speed voltage and the high-speed voltage, or a unusually high summed voltage, are detected by the ADC 140, the micro-controller is configured to disconnect the switching module 149 from the motor 104, or to disable the inverter module 132 such that no frequency-regulated voltage is generated. Thereafter, the micro-controller 144 is configured to read the voltage output from the tapped winding relay 108, and to determine an appropriate soft control signal to generate to control the switching module 149 as described earlier. In an alternative embodiment, the micro-controller 144 can also be configured to detect the presence of the condition where both voltages are fed to the FSD. Upon detecting this condition, the micro-controller 144 can operate the motor 104 at a third speed, a low-speed, a high-speed, or a zero speed setting.

Various features and advantages of the invention are set forth in the following claims.

The invention claimed is:

1. A controller for an electric machine, the controller comprising:
   a switch coupled to the electric machine, having a plurality of power inputs, and operable to selectively couple one of the power inputs to the electric machine;
   a first voltage input coupled to one of the power inputs of the switch, configured to receive a first voltage, and operable to provide the first voltage to the switch;
   an inverter coupled to a second voltage input and a second power input of the switch, and configured to be activated by a second voltage received at the second voltage input, to frequency-regulate the second voltage to generate a frequency-regulated voltage, and to provide the frequency-regulated voltage to the switch;
   a module coupled to the first and second voltage inputs to receive the first and second voltages, and configured to generate different signals representing the receipt of the first and second voltages; and
   a micro-controller coupled to the module to receive the different signals, and configured to generate a soft control signal based on the different signals and to selectively control the coupling of one of the first voltage and the frequency regulated voltage to the electric machine with the soft control signal applied to the switch.

2. The controller of claim 1, further comprising a feedback monitor configured to monitor the frequency-regulated voltage, and to accordingly configure the inverter to regulate an inverter output.

3. The controller of claim 1, further comprising a relay configured to relay an alternating current ("AC") source as the first voltage, and to generate the second voltage using the AC source.

4. The controller of claim 1, and wherein
the module includes a summing module coupled to the micro-controller, and configured to generate the different signals to represent the first voltage and the second voltage.

5. The controller of claim 1, further comprising a rectifying module coupled to the inverter module, and configured to provide power to the inverter module.

6. The controller of claim 1, and wherein the first voltage indicates a high speed excitation, and the second voltage indicates a low speed excitation.

7. The controller of claim 1, and wherein the electric machine comprises a multiple-tapped motor, and the first voltage represents one of a plurality of motor speed at one operating frequency.

8. The controller of claim 7, and wherein the one operating frequency is 60 Hz.

9. The controller of claim 1, and wherein the electric machine comprises a single speed motor, and the first voltage represents a motor speed at one operating frequency.

10. The controller of claim 9, and wherein the one operating frequency is 60 Hz.

11. A controller for an electric machine, the controller comprising:
a voltage input configured to receive a first voltage;
a relay module coupled to the voltage input, and configured to relay the first voltage and to generate a second voltage;
an inverter coupled to the relay module, and configured to be activated by the second voltage, and to generate a frequency-regulated voltage;
a module coupled to the relay module to receive the first voltage and the second voltage, and configured to generate different signals representing the first voltage and the second voltage;
a micro-controller coupled to the module to receive the different signals, and configured to generate a soft control signal based on the different signals;
a second relay coupled to the micro-controller, and configured to select an electric machine operating voltage from the first voltage and the frequency regulated voltage using the soft control signal.

12. The controller of claim 11, further comprising a feed monitor configured to monitor the frequency-regulated voltage and to accordingly configure the inverter to regulate an inverter output.

13. The controller of claim 11, further comprising a rectifying module coupled to the inverter, and configured to provide power to the inverter.

14. The controller of claim 11, and wherein the first voltage indicates a high speed excitation, and the second voltage indicates a low speed excitation.

15. The controller of claim 11, and wherein the electric machine comprises a multiple-tapped motor, and the first voltage represents one of a plurality of motor speed voltages at one operating frequency.

16. The controller of claim 11, and wherein the one operating frequency is 60 Hz.

17. The controller of claim 11, and wherein the electric machine comprises a single speed motor, and the first voltage represents a motor speed at one operating frequency.

18. A controller for an electric machine, the controller comprising:
an inverter coupled to a first voltage input, the inverter configured to be activated by a first voltage received at a first voltage input, and to frequency-regulate the first voltage to generate a frequency-regulated voltage; and
a switch coupled to the inverter and a second voltage input, the switch configured to receive the frequency-regulated voltage and the second voltage received at the second voltage input, and to selectively apply one of the received voltages to the electric machine;
a module coupled to the first and second voltage inputs, the module configured to receive the first and second voltages and to generate different signals to represent the receipt of the first and second voltages; and
a micro-controller coupled to the module to receive the different signals, and configured to generate a soft control signal based on the different signals and to selectively control the coupling of one of the second voltage and the frequency regulated voltage to the electric machine with the soft control signal applied to the switch.

19. The controller of claim 18, further comprising a feedback monitor configured to monitor the frequency-regulated voltage, and to accordingly configure the inverter to regulate an inverter output.

20. The controller of claim 18, further comprising a relay configured to relay an alternating current ("AC") source as the second voltage input, and to generate the first voltage using the AC source.

21. The controller of claim 18, and wherein
the module includes a summing module coupled to the micro-controller, and configured to generate the different signals to represent the first voltage and the second voltage.

22. The controller of claim 18, further comprising a rectifying module coupled to the inverter module, and configured to provide power to the inverter module.

23. The controller of claim 18, and wherein the first voltage indicates a high speed excitation, and the first voltage indicates a low speed excitation.

24. The controller of claim 18, and wherein the electric machine comprises a multiple-tapped motor, and the first voltage represents one of a plurality of motor speed at one operating frequency.

25. The controller of claim 24, and wherein the one operating frequency is 60 Hz.

26. The controller of claim 18, and wherein the electric machine comprises a single speed motor, and the first voltage represents a motor speed at one operating frequency.

27. The controller of claim 26, and wherein the one operating frequency is 60 Hz.

* * * * *